United States Patent
Creamer et al.

(10) Patent No.: US 7,050,557 B2
(45) Date of Patent: May 23, 2006

(54) E-MAIL WITH VOICE / PHONE CONFERENCE FEATURE

(75) Inventors: Thomas E. Creamer, Boca Raton, FL (US); Victor S. Moore, Boynton Beach, FL (US); Glen R. Walters, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 09/910,271

(22) Filed: Jul. 19, 2001

(65) Prior Publication Data

US 2003/0016805 A1    Jan. 23, 2003

(51) Int. Cl.
*H04M 3/42*    (2006.01)

(52) U.S. Cl. .............................. 379/205.01; 379/93.21; 379/158

(58) Field of Classification Search ........... 379/202.01, 379/201.01, 88.17, 93.21, 158, 205.01; 709/204; 345/758, 753

See application file for complete search history.

(56) References Cited

U.S. PATENT DOCUMENTS

| 6,549,612 B1 * | 4/2003 | Gifford et al. ............. 379/67.1 |
| 6,563,914 B1 * | 5/2003 | Sammon et al. ....... 379/202.01 |
| 6,771,745 B1 * | 8/2004 | Ivory ...................... 379/88.13 |
| 2002/0076025 A1 * | 6/2002 | Liversidge et al. .... 379/202.01 |

OTHER PUBLICATIONS

U.S. Appl. No. 09/910,187, filed Jul. 19, 2001, Creamer et al.
U.S. Appl. No. 09/910,270, filed Jul. 19, 2001, Creamer et al.
U.S. Appl. No. 10/038,719, filed Jan. 3, 2002, Creamer et al.

* cited by examiner

*Primary Examiner*—Fan Tsang
*Assistant Examiner*—Olisa Anwah
(74) *Attorney, Agent, or Firm*—Akerman Senterfitt

(57) ABSTRACT

An e-mail communication method can include a series of steps. The steps can include inserting in an e-mail message a voice conference identifier comprising a voice conference call list identifying conference call nodes. The e-mail message can be transmitted to a recipient at a recipient node. Responsive to the recipient selecting the voice conference identifier, a voice conference call between selected ones of the identified conference call nodes can be established.

23 Claims, 3 Drawing Sheets

E-MAIL WITH VOICE / PHONE CONFERENCE FEATURE

BACKGROUND OF THE INVENTION

1. Technical Field

This invention relates generally to an electronic mail system, and more particularly to an electronic mail system enhanced with voice conference call communications capabilities.

2. Description of the Related Art

Electronic mail (e-mail) systems have become a fixture of current computer communications technology. E-mail provides a low cost, efficient, and effective means for exchanging text messages between sending and recipient nodes. Conventional e-mail messages typically are contained in electronic documents which can be transmitted from a sending mail server to a recipient mail server. In particular, the sending node can create and appropriately format an e-mail and transmit the e-mail to a specified mail server. The mail server can examine the contents of the e-mail to determine to whom the e-mail should be forwarded. Subsequently, the e-mail can be transmitted to a mail server associated with the intended recipient node.

Once the e-mail has been successfully transmitted to the recipient mail server, the recipient mail server can store the received e-mail typically in an electronic "inbox". Subsequently, the intended recipient node can retrieve the e-mail from the mail server on demand. Once retrieved, the contents of the e-mail can be revealed through the presentation of the e-mail message text to the recipient. Additionally, other information contained in the e-mail such as the identity of the sender, the subject of the e-mail message, and the date and time when the e-mail had been transmitted also can be presented to the user. Hence, conventional e-mail messages can contain not only message text, but also message header information.

Conventional e-mail systems also can support the exchange of e-mail attachments. Attachments are electronic files such as images, documents or binary objects which can be attached to an e-mail and transmitted therewith from a sender to a recipient. Attachments can be embedded in a labeled section of an e-mail such that an e-mail client processing the e-mail can identify the presence of an attachment and can decode the contents of the attachment so that the attachment can be further processed by the recipient node. Consequently, attachments can enhance the utility of exchanging e-mail.

Still, e-mail and e-mail attachments are not always an adequate replacement for live voice conversations between two parties, especially where extensive interaction between the participants is necessary or desirable. In some instances, such conversations are necessary to explain or discuss the message text included in the e-mail, attached documents, or audio/visual files. Moreover, a telephone sometimes is not available to the parties, or the use of a telephone requires lengthy dialing procedures which can interrupt the spontaneity of the communication. Sometimes telephone access by the parties requires that at least one of the parties terminate an on-line connection to the Internet, which further can disrupt the process of discussing the contents of an e-mail.

The aforementioned difficulties can be further exacerbated when more than two parties are involved within a given e-mail communication chain. The serial nature of e-mail communications can result in redundant e-mail forwarding of existing messages to parties in an effort keep each party fully apprized of developments. Moreover, use of e-mail with more than two parties can result in unnecessary communication delays. For example, an e-mail containing important data can be routed to several different parties before ultimately reaching the proper party.

SUMMARY OF THE INVENTION

The present invention provides an electronic mail (e-mail) communications method and system for processing an electronic message which has been configured in accordance with the inventive arrangements. A voice conference identifier can be included within an e-mail. The voice conference identifier can include a voice conference call list specifying conference call nodes. A recipient node of the e-mail message can detect the voice conference identifier in the e-mail message and, in addition to displaying message text contained in the message, can display one or more selectable icons. Responsive to the selection of one or more of the icons, a voice communications link can be established between selected conference call nodes. The voice communications link can be a Voice over IP (VoIP) based voice communications link over the computer communications network or a telephony-based voice communications link over a public switched telephone network (PSTN).

One aspect of the present invention can include an e-mail communication method including inserting in an e-mail message a voice conference identifier comprising a voice conference call list identifying conference call nodes. The voice conference call list can specify telephone numbers or IP addresses for the identified conference call nodes. The e-mail message can be transmitted to a recipient at a recipient node, wherein responsive to the recipient selecting the voice conference identifier, a voice conference call between selected ones of the identified conference call nodes can be established. Notably, the conference call can be established using VoIP based voice communications links or telephony-based voice communications links over the PSTN.

A selectable symbol for initiating the voice conference call with selected ones of the identified conference call nodes also can be inserted in the e-mail message. Alternatively, a plurality of selectable symbols can be inserted in the e-mail message. In that case, each symbol can initiate a voice communications link with a selected one of the identified conference call nodes. Additionally, computer program code can be embedded in the e-mail message. The computer program code can be configured to establish a plurality of voice communications links between the selected ones of the identified conference call nodes thereby establishing the conference call.

Another aspect of the invention can include an e-mail communication method including detecting a voice conference identifier having a voice conference call list identifying conference call nodes in an e-mail message received by a recipient at a recipient node. The voice conference call list can specify telephone numbers or IP addresses for the identified conference call nodes. Responsive to detecting the voice conference identifier, at least one selectable icon can be displayed. Additionally, responsive to a selection of the at least one selectable icon, a voice conference call between selected ones of the identified conference call nodes can be established.

For example, a single icon can be displayed wherein the voice conference call between the selected ones of the identified conference call nodes can be established responsive to the selection of the single icon. Alternatively, a plurality of icons can be displayed. In that case, each icon can correspond to one of the voice conference call nodes. A voice communications link with the selected ones of the conference call nodes can be established responsive to selection of corresponding ones of the plurality of icons.

The establishing step can include extracting from the e-mail message embedded computer program code configured to establish the voice conference call between the selected ones of the identified conference call nodes. Responsive to the selection of the at least one icon, the embedded computer program code can be executed in order to establish the voice conference call. In addition, responsive to the selection of the at least one icon, a telephone number or an IP address for the selected ones of the identified conference call nodes can be determined based on the voice conference call list. Regardless, the voice conference call can be established using VoIP based voice communications links or telephony-based voice communications links over the PSTN.

Another aspect of the invention can include an e-mail message comprising header information identifying a sending node and a recipient node, a message portion displaying content from the sending node to the recipient node, and a voice conference identifier. The voice conference identifier can include a voice conference call list specifying conference call nodes to be connected via a voice conference call, wherein the recipient node is a conference call node. The e-mail message further can include embedded computer program code. The computer program code can be configured to establish a plurality of voice communications links between selected ones of the specified conference call nodes thereby establishing the conference call.

Yet another aspect of the invention can include an electronic mail client comprising a conventional electronic mail processor. The conventional electronic mail processor can extract and display message text encapsulated in a received electronic mail. A voice conference processor also can be included. The voice conference processor can identify a voice conference identifier encapsulated in the received electronic mail, display at least one selectable icon in response to detecting the voice conference identifier, and responsive to a selection of the at least one selectable icon, establish a voice conference call between selected conference call nodes specified by the voice conference identifier.

BRIEF DESCRIPTION OF THE DRAWINGS

There are shown in the drawings embodiments which are presently preferred, it being understood, however, that the invention is not so limited to the precise arrangements and instrumentalities shown.

DETAILED DESCRIPTION OF THE INVENTION

The present invention provides an electronic mail (e-mail) communications method and system for processing an electronic message which has been configured in accordance with the inventive arrangements. A voice conference identifier can be included in an e-mail message sent by a sending node. The voice conference identifier can include a voice conference call list specifying voice conference call nodes. When a voice conference identifier has been included within an e-mail message, a recipient node of the e-mail message can detect the voice conference identifier. In addition to displaying message text contained in the e-mail message, an e-mail client at the recipient node can display one or more selectable icons. Responsive to the selection of one or more of the icons, a voice communications link can be established between the recipient node and selected specified conference call nodes. Notably, the sender of the e-mail message can be included within the identified conference call nodes. The voice communications link can be a Voice over IP (VoIP) based voice communications link over the computer communications network, or a telephony-based voice communications link over a public switched telephone network (PSTN).

Figure 1:
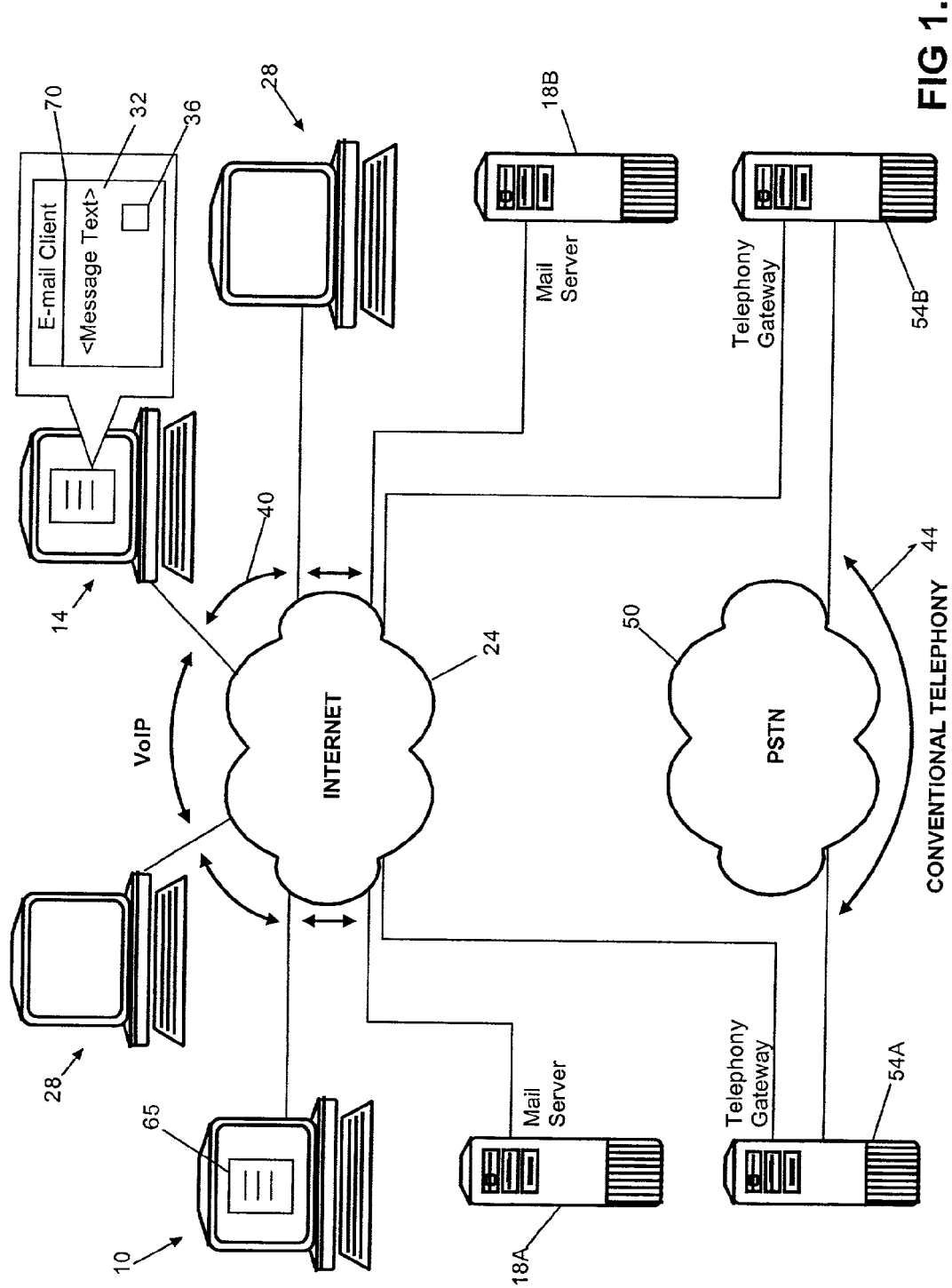
FIG. 1 is a schematic diagram of an exemplary network based electronic mail system for use in the present invention.

An exemplary network based e-mail system according to the invention is shown in FIG. 1. A first e-mail client 65 in a sending node 10 and a second e-mail client 70 in a recipient node 14 are shown although the invention can be utilized with any number and configuration of e-mail clients acting as both sending and recipient nodes. In one exemplary case illustrated in FIG. 1, however, e-mail messages can be transmitted and received by the first e-mail client 65 over a computer communications network such as the Internet 24 through a mail server 18A. Similarly, e-mail messages can be transmitted and received by the second e-mail client 70 over a computer communications network such as the Internet 24 through a second mail server 18B. Still, the invention is not limited to a particular mail server configuration and one mail server can be used by both the first and second e-mail clients 65 and 70 to send and receive e-mail messages.

Once received, an e-mail message can be parsed and the contents 32 can be displayed in the e-mail client 70 as is well-known in the art. Information pertaining to the identity of the sending, recipient, and conference call participants, as well as the sending, recipient, and conference call nodes can be extracted from the e-mail message and optionally displayed in the e-mail client 70. Other pertinent data also can be extracted from the e-mail message and optionally displayed in the e-mail client 70. Examples of pertinent data can include references to the sending node and one or more recipient nodes such as network IP addresses. Pertinent data also can include a message subject and transmission date and time information.

Importantly, a voice conference identifier can be included in the e-mail message to indicate that a voice communications link can be established between a plurality of conference call nodes. For example, the voice conference identifier can include a voice conference call list specifying the conference call nodes as a separate data source. Alternatively, the voice conference call list can include references to one or more conventional e-mail fields such as "To", "From", "CC" (carbon copy), and "BC" (blind copy), or any other fields within the e-mail header. Regardless, the voice conference identifier can specify a plurality of conference call nodes 28 such that voice communications links can be established between the conference call nodes. It should be appreciated by those skilled in the art that the recipient node 14 and the sending node 10 can be included within the conference call. Accordingly, conference call nodes 28, as used herein can include the recipient node 14 and the sending node 10 if so specified within the voice conference call list. Further conference call nodes 28 can include other nodes in the computer communications network to be included in the conference call.

Upon receipt of an e-mail message, the e-mail client 70 can detect the voice conference identifier when parsing the e-mail message. Responsive to detecting a voice conference identifier in the e-mail message, the e-mail client can display a selectable voice communications icon 36 which can indicate to an e-mail message recipient that voice communications links can be established between the conference call nodes specified within the voice conference identifier. The icon 36 can be displayed within the present message text 32, although alternative placement of the icon 36 is possible. The icon 36 can be any suitable text or graphic symbol, but preferably represents voice communications to a typical viewer.

Selection of the icon 36 by a viewer can cause the establishment of multiple voice communications links between the specified conference call nodes 28 thereby resulting in a conference call. In particular, though the voice communications links can be provided through any suitable voice communications technology, in one aspect of the present invention, a voice communications link 40 can be provided over the Internet 24 based upon the VoIP protocol. In another aspect of the invention, a voice communications link 44 can be provided using a conventional telephony link 44 provided by conventional telephony gateways 54A and 54B over a PSTN 50.

In another embodiment of the invention, the e-mail client 70 can display a plurality of selectable icons 36 wherein each selectable icon can correspond to a particular conference call node. Accordingly, responsive to the selection of each icon 36, a voice communications link can be established between the recipient node and the conference call node corresponding to the selected icon as well as with other conference call nodes having an established voice communications link with the recipient node. Alternatively, responsive to selection of two or more icons, voice communications links can be established between the conference call nodes corresponding to the selected icons.

Figure 2:
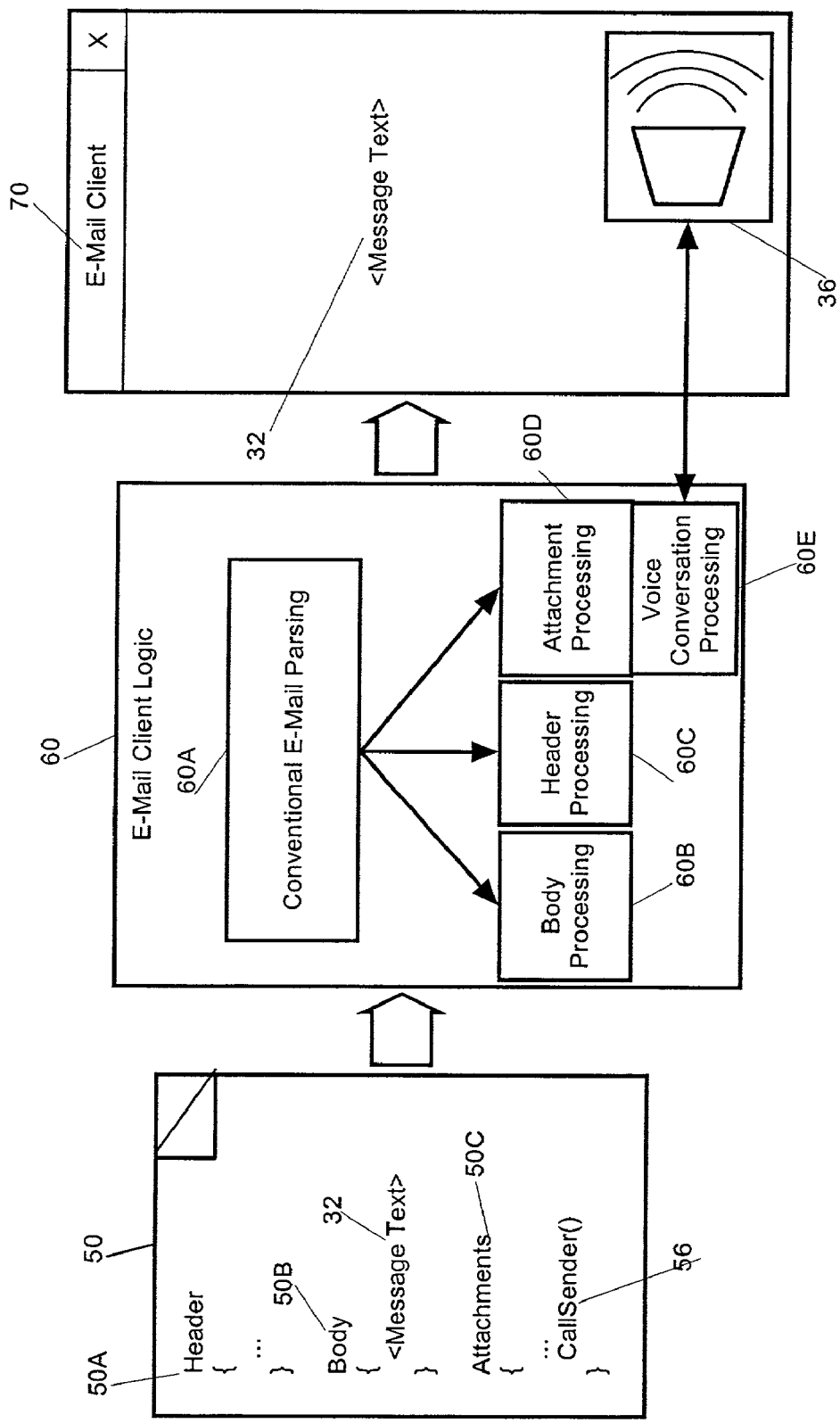
FIG. 2 is a block diagram of an exemplary e-mail client processing electronic mail configured with a voice conference feature in accordance with the inventive arrangements.

FIG. 2 is a block diagram which illustrates an exemplary process sequence in an e-mail client configured in accordance with the present invention. In particular, as shown in FIG. 2, an electronic message 50 can be configured with a voice conference identifier 56. E-mail client logic 60 can process the electronic message 50 so that the message text 32 can be displayed in the e-mail client 70. E-mail client logic 60 also can process the electronic message 50 so as to detect the voice conference identifier 56 and to responsively provide a selectable icon 36 in the e-mail client 70.

More particularly, in accordance with the inventive arrangements an electronic message 50 can be configured to include a message header component 50A which can encapsulate a reference to at least one of a sending node in the network and a recipient node in the network. The electronic message 50 also can be configured to include a text message component 50B which can encapsulate message text 32. The message text 32 can be extracted from the electronic message 50 and displayed in a message client 70. Finally, the electronic message 50 can be configured to include an attachments component 50C which can encapsulate message attachments in addition to the voice conference identifier 56.

Notably, the voice conference identifier 56 can include basic information denoting the ability to establish a voice communications link with specified conference call nodes. Notwithstanding, the invention is not limited in this regard and in an alternative aspect of the invention, the voice conference identifier 56 can include an executable voice communications link program component. When executed, the voice communications link program can establish a voice communications link between the specified conference call nodes.

As will be apparent to one skilled in the art, the voice communications link program component can be implemented using not only a scripting language such as Javascript or VBScript, but also the voice communications link program component can be a compiled object whose binary representation is included in the e-mail message 50. In that case, when extracted from the e-mail message 50, the compiled object can be independently executed without requiring intermediate script interpretation. Finally, it will be apparent to one skilled in the art that the voice communications link program can be a reference to a program residing elsewhere in a computer communications network. Selection of the reference can cause the program to be downloaded and executed in the recipient node.

Returning now to FIG. 2, e-mail client logic 60 associated with the e-mail client 70 can process the e-mail message 50, first by parsing the contents of the e-mail message 50 in an e-mail parsing component 60A. In particular, the message text 32 in the e-mail message 50 can be extracted from the e-mail message using body processing component 60B. Likewise, header information such as the address of the sender and recipients, can be extracted from the e-mail message using header processing component 60C. Finally, attachments included in the e-mail message can be processed in the attachment processing component 60D.

As shown in FIG. 2, a voice conversation processor 60E can be provided for use in the e-mail client logic 60. The voice conversation processor 60E can detect the presence of the voice conference identifier 56 encapsulated in the e-mail message 50. Responsive to detecting the voice communications link identifier 56, the voice conversation processing component 60E can cause the placement of a selectable icon 36 in the e-mail client 70. Subsequently, the selection of the selectable icon 36 can cause the establishment of voice communications links between the specified conference call nodes. Notably, the establishment of the voice communications links can be achieved through program code provided by the e-mail client 70, by a plug-in to the e-mail client, by the e-mail message 50 itself, or by remote code referenced by either the e-mail client 70 or the voice conference identifier 56.

The identity information required to establish the voice communications link can be provided in the message header component 50A. Still, the invention is not limited in this regard and the message header component 50A can merely contain a reference to the sending node, recipient nodes, or even other conference call nodes, which, in of itself, can be inadequate to establish a voice communications link. In that case, the reference can be used to retrieve the required information. For example, the reference can act as a key to a directory lookup service such as an LDAP database. Using the key, suitable identity information can be retrieved, such as IP addresses and telephone numbers, with which a voice communications link can be established.

Figure 3:
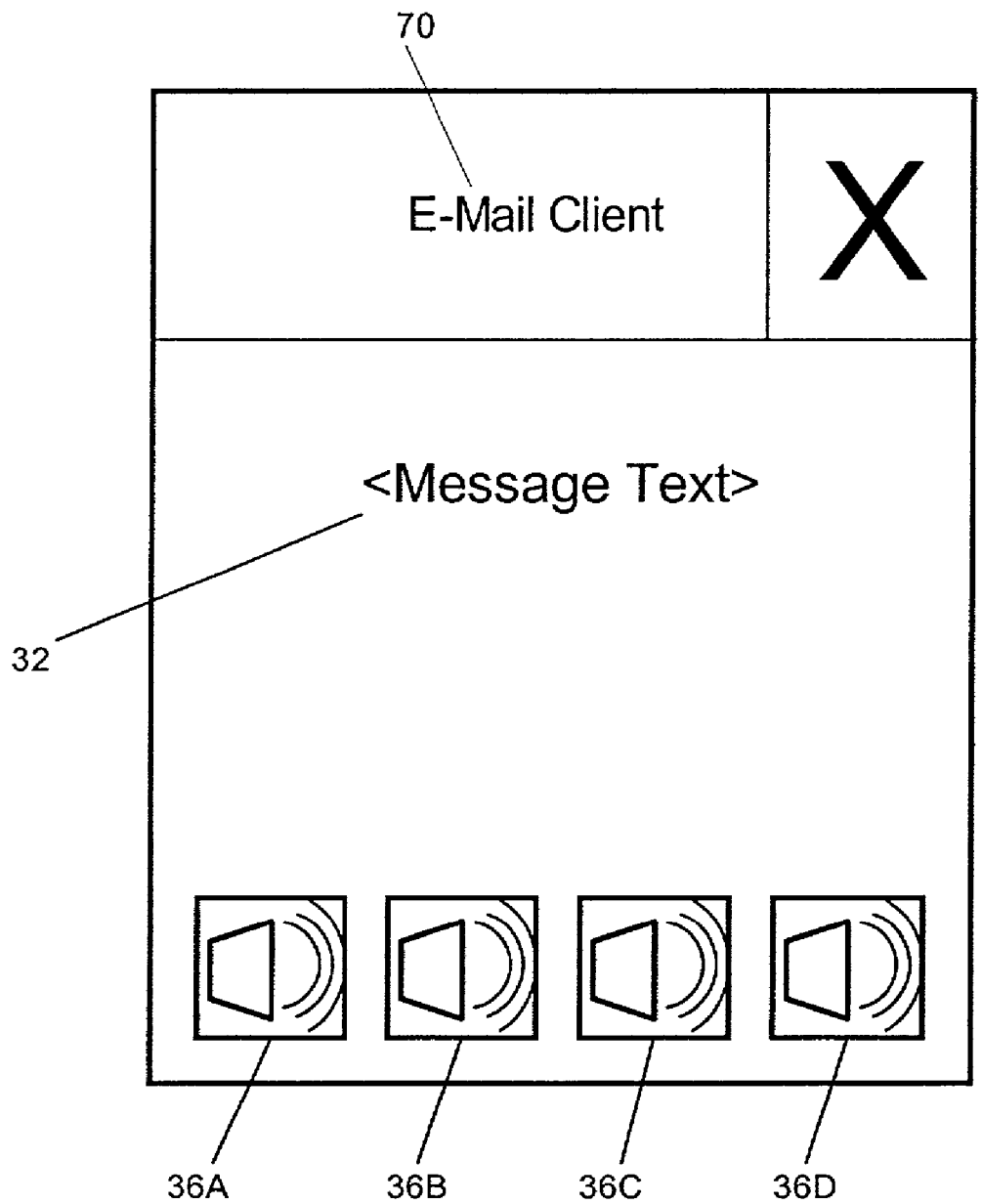
FIG. 3 is a block diagram of an exemplary e-mail client in accordance with the inventive arrangements.

Though only a single selectable icon 36 is shown in FIG. 2, the invention is not so limited. Accordingly, FIG. 3 is a block diagram of an exemplary e-mail client in accordance with the inventive arrangements having a plurality of selectable icons 36A, 36B, 36C, and 36D, as well as contents 32. Based upon recipient and recipient node information extracted from the message header component 50A, or the voice conference identifier as specified herein, corresponding selectable icons 36A–36D can be provided. Alternatively, the icons can be included within the e-mail message.

The selectable icons 36A–36D can include a reference to a corresponding conference call node such as an appropriate text label. Responsive to the selection of the selectable icons 36A–36D, a voice communications link can be established between one or more corresponding conference call nodes. For example, in the case where a user selects one of the plurality of selectable icons, a communications link can be established between the recipient node and the conference call node corresponding to the selected icon. Accordingly, upon selection of a second selectable icon, a voice communications link with the conference call node corresponding to that selected icon can be initiated such that a conference call results between the recipient node and the two selected conference call nodes. Where two or more icons are selected, a conference call can be established between conference call nodes corresponding to the selectable icons. Notably, the sending node and recipient node can be included in the conference call if so specified. In this manner conference calls can be established for all sending/recipient nodes, or for selected groups of sending/recipient nodes such as only those recipient nodes in a given department, or for other conference call nodes specified in the voice conference call list. In another embodiment, each icon of the plurality of selectable icons 36A–36D can correspond to a conference call connection with an identified group or class of conference call nodes, for instance departments or product design teams.

The present invention can be realized in hardware, software, or a combination of hardware and software. Moreover, the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Significantly, this invention can be embodied in other specific forms without departing from the spirit or essential attributes thereof, and accordingly, reference should be had to the following claims, rather than to the foregoing specification, as indicating the scope of the invention.

What is claimed is:

1. An e-mail communication method comprising the steps of:
   inserting a voice conference identifier in an e-mail message from an initiating party to a recipient party, the voice conference identifier comprising a voice conference call list specifying a data source of potential conference call nodes and further comprising an executable voice communications link program component, the executable voice communications link program component comprising a binary representation of a compiled object for establishing a voice communications link between the conference call nodes;
   transmitting said e-mail message to the recipient party at a recipient node;
   causing the recipient node to display a plurality of selectable voice communications icons in response to detection of the voice conference identifier at the recipient node, each selectable voice communications icon uniquely corresponding to a particular conference call node specified by the data source; and
   establishing a voice communications link between the recipient node and at least one conference call node using the executable voice communications link program component in response to a selection of at least one of the plurality of selectable voice communications icons.

2. The e-mail communication method of claim 1, wherein said conference call is established using Voice over IP (VoIP) based voice communications links.

3. The e-mail communication method of claim 1, wherein said conference call is established using telephony-based voice communications links over a public switched telephone network (PSTN).

4. The e-mail communication method of claim 1, wherein said voice conference call list specifies telephone numbers for said identified conference call nodes.

5. The e-mail communication method of claim 1, wherein said voice conference call list specifies IP addresses for said identified conference call nodes.

6. An e-mail communication method comprising the steps of:
   in an e-mail message from an initiating party to a recipient party at a recipient node, detecting at the recipient node a voice conference identifier comprising a voice conference call list specifying a data source of potential conference call nodes and further comprising an executable voice communications link program component, the executable voice communications link program component comprising a binary representation of a compiled object for establishing a voice communications link between the conference call nodes;
   responsive to detecting said voice conference identifier at the recipient node, causing the recipient node to display a plurality of selectable voice communications icons, each selectable voice communications icon uniquely corresponding to a particular conference call node specified by the data source; and
   responsive to a selection of at least one of the plurality of selectable voice communications icons, establishing a voice communications link between the recipient node and at least one conference call node using the executable voice communications link program component.

7. The e-mail communication method of claim 6, wherein said voice conference call list includes telephone numbers for said identified conference call nodes.

8. The e-mail communication method of claim 6, wherein said voice conference call list includes IP addresses for said identified conference call nodes.

9. The e-mail communication method of claim 6, wherein said voice conference call is established using Voice over IP (VoIP) based voice communications links.

10. The e-mail communication method of claim 6, wherein said voice conference call is established using telephony-based voice communications links over a public switched telephone network (PSTN).

11. An electronic mail (e-mail) message comprising:
 header information, said header information identifying a sending node and at least one recipient node;
 a message portion, said message portion displaying content from said sending node to said recipient node; and
 a voice conference identifier comprising a voice conference call list specifying a data source of potential conference call nodes to be connected via a voice conference call, and further comprising an executable voice communications link program component, the executable voice communications link program component comprising a binary representation of a compiled object for establishing a voice communications link between the conference call nodes;
 the e-mail message being an e-mail message sent from an initiating party to a recipient party at a recipient node; and
 the voice conference call identifier being configured to cause the recipient node to display a plurality of selectable voice communications icons in response to detection of the voice conference identifier at the recipient node, each selectable voice communications icon corresponding to a particular conference call node specified by the data source such that a selection of at least one of the plurality of selectable voice communications icons establishes a voice communications link between the recipient node and at least one conference call node using the executable voice communications link program component in response.

12. A machine readable storage having stored thereon a computer program having a plurality of code sections executable by a machine for causing the machine to perform the steps of:
 inserting a voice conference identifier in an e-mail message from an initiating party to a recipient party, the voice conference identifier comprising a voice conference call list specifying a data source of potential conference call nodes and further comprising an executable voice communications link program component, the executable voice communications link program component comprising a binary representation of a compiled object for establishing a voice communications link between the conference call nodes;
 transmitting said e-mail message to the recipient party at a recipient node;
 causing the recipient node to display a plurality of selectable voice communications icons in response to detection of the voice conference identifier at the recipient node, each selectable voice communications icon uniquely corresponding to a particular conference call node specified by the data source; and
 establishing a voice communications link between the recipient node and at least one conference call node using the executable voice communications link program component in response to a selection of at least one of the plurality of selectable voice communications icons.

13. The machine readable storage of claim 12, wherein said conference call is established using a Voice over IP (VoIP) based voice communications links.

14. The machine readable storage of claim 12, wherein said conference call is established using telephony-based voice communications links over a public switched telephone network (PSTN).

15. The machine readable storage of claim 12, wherein said voice conference call list specifies telephone numbers for said identified conference call nodes.

16. The machine readable storage of claim 12, wherein said voice conference call list specifies IP addresses for said identified conference call nodes.

17. A machine readable storage having stored thereon a computer program having a plurality of code sections executable by a machine for causing the machine to perform the steps of:
 in an e-mail message from an initiating to a recipient party at a recipient node, detecting at the recipient node a voice conference identifier comprising a voice conference call list specifying a data source of potential conference call nodes and further comprising an executable voice communications link program component, the executable voice communications link program component comprising a binary representation of a compiled object for establishing a voice communications link between the conference call nodes;
 responsive to detecting said voice conference identifier at the recipient node, causing the recipient node to display a plurality of selectable voice communications icons, each selectable voice communications icon uniquely corresponding to a particular conference call node specified by the data source; and
 responsive to a selection of at least one of the plurality selectable voice communications icons, establishing a voice communications link between the recipient node and at least one conference call node using the executable voice communications link program component.

18. The machine readable storage of claim 17, wherein said voice conference call list includes telephone numbers for said identified conference call nodes.

19. The machine readable storage of claim 17, wherein said voice conference call list includes IP addresses for said identified conference call nodes.

20. The machine readable storage of claim 17, wherein said voice conference call is established using Voice over IP (VoIP) based voice communications links.

21. The machine readable storage of claim 17, wherein said voice conference call is established using telephony-based voice communications links over a public switched telephone network (PSTN).

22. The machine readable storage of claim 17, said establishing step further comprising:
 responsive to said recipient party selecting at least one of said plurality of selectable voice communications icons, determining a telephone number or an IP address for said selected ones of said identified conference call nodes based on said voice conference call list.

23. An electronic mail client comprising:
 a conventional electronic mail processor, said conventional electronic mail processor extracting and displaying message text encapsulated in an electronic mail message sent from an initiating party to a recipient party and received in a recipient node; and,
 a voice conference processor, said voice conference processor identifying a voice conference identifier encapsulated in said received electronic mail, displaying a plurality of selectable icons in response to detecting said voice conference identifier, and responsive to a selection of at least one said plurality of selectable icons, establishing a voice conference call between selected conference call nodes based on an executable voice communications link program component contained in the voice conference identifier and comprising a binary representation of a compiled object for establishing a voice communications link between the conference call nodes.

* * * * *